(12) United States Patent
Parry

(10) Patent No.: US 7,444,802 B2
(45) Date of Patent: Nov. 4, 2008

(54) GAS TURBINE ENGINE INCLUDING STATOR VANES HAVING VARIABLE CAMBER AND STAGGER CONFIGURATIONS AT DIFFERENT CIRCUMFERENTIAL POSITIONS

(75) Inventor: Anthony B Parry, Derby (GB)

(73) Assignee: Rolls-Royce plc, London (GB)

( * ) Notice: Subject to any disclaimer, the term of this patent is extended or adjusted under 35 U.S.C. 154(b) by 704 days.

(21) Appl. No.: 10/851,188

(22) Filed: May 24, 2004

(65) Prior Publication Data

US 2004/0258520 A1   Dec. 23, 2004

(30) Foreign Application Priority Data

Jun. 18, 2003   (GB) ................................ 0314123

(51) Int. Cl.
  *F02K 3/02*   (2006.01)
(52) U.S. Cl. .................... 60/226.1; 415/160; 415/211.2
(58) Field of Classification Search ............... 60/226.1, 60/226.3, 262; 415/209.1, 160, 211.2
  See application file for complete search history.

(56) References Cited

U.S. PATENT DOCUMENTS

| | | | | |
|---|---|---|---|---|
| 2,798,661 | A * | 7/1957 | Willenbrock et al. ...... | 415/209.1 |
| 3,572,960 | A * | 3/1971 | McBride ..................... | 415/115 |
| 4,292,802 | A * | 10/1981 | Snow .......................... | 60/204 |
| 4,376,375 | A * | 3/1983 | Boudigues ................. | 60/226.3 |
| 4,695,220 | A * | 9/1987 | Dawson ....................... | 415/9 |
| 5,314,301 | A * | 5/1994 | Knight ..................... | 415/209.1 |
| 6,082,966 | A * | 7/2000 | Hall et al. ................ | 415/209.1 |
| 6,139,259 | A * | 10/2000 | Ho et al. ...................... | 415/119 |
| 6,195,983 | B1 | 3/2001 | Wadia et al. | |
| 6,457,938 | B1 * | 10/2002 | Liu et al. ..................... | 415/160 |
| 6,983,588 | B2 * | 1/2006 | Lair ........................... | 60/226.1 |
| 7,114,911 | B2 * | 10/2006 | Martin et al. ................. | 415/1 |
| 7,118,331 | B2 * | 10/2006 | Shahpar ...................... | 415/195 |
| 7,232,287 | B2 * | 6/2007 | Regunath .................... | 415/160 |
| 7,299,621 | B2 * | 11/2007 | Bart et al. .................. | 60/226.1 |
| 2002/0159883 | A1 * | 10/2002 | Simon et al. ................ | 415/193 |
| 2003/0152459 | A1 * | 8/2003 | Gliebe ...................... | 415/211.2 |
| 2005/0135926 | A1 * | 6/2005 | Selby .......................... | 415/160 |
| 2005/0254938 | A1 * | 11/2005 | Sheath et al. ............... | 415/160 |

OTHER PUBLICATIONS

Chen et al., Enhancing Compressor Distortion Tolerance by Asymmetric Stator Control, Massachusetts Institute of Technology, 1987.

* cited by examiner

*Primary Examiner*—William H Rodriguez
(74) *Attorney, Agent, or Firm*—W. Warren Taltavull; Manelli Denison & Selter PLLC

(57) ABSTRACT

Within an intake for a gas turbine engine provision is provided through stator vanes 25, 45 in the stator whereby back pressure from a necessary obstruction 34, 46 can be utilised to balance forward pressure variations caused by intake droop or crosswinds in order to reduce those forward pressure detriments for more efficient engine operation according to a desired objective regime. Typically the flow through the intake 20 is analysed and then an appropriate positioning of the stator vanes 25, 45 determined in order to provide approximate balance between the forward pressures and back pressures. Normally, a combination of camber variation of stator vanes 45a and stagger variation of stator vanes 45b are utilised in order to achieve a desired momentum balance around the circumference of the intake 20. It will be understood that both the forward pressures and the back pressures are differentially variable about the circumference such that one opposes the other.

22 Claims, 8 Drawing Sheets

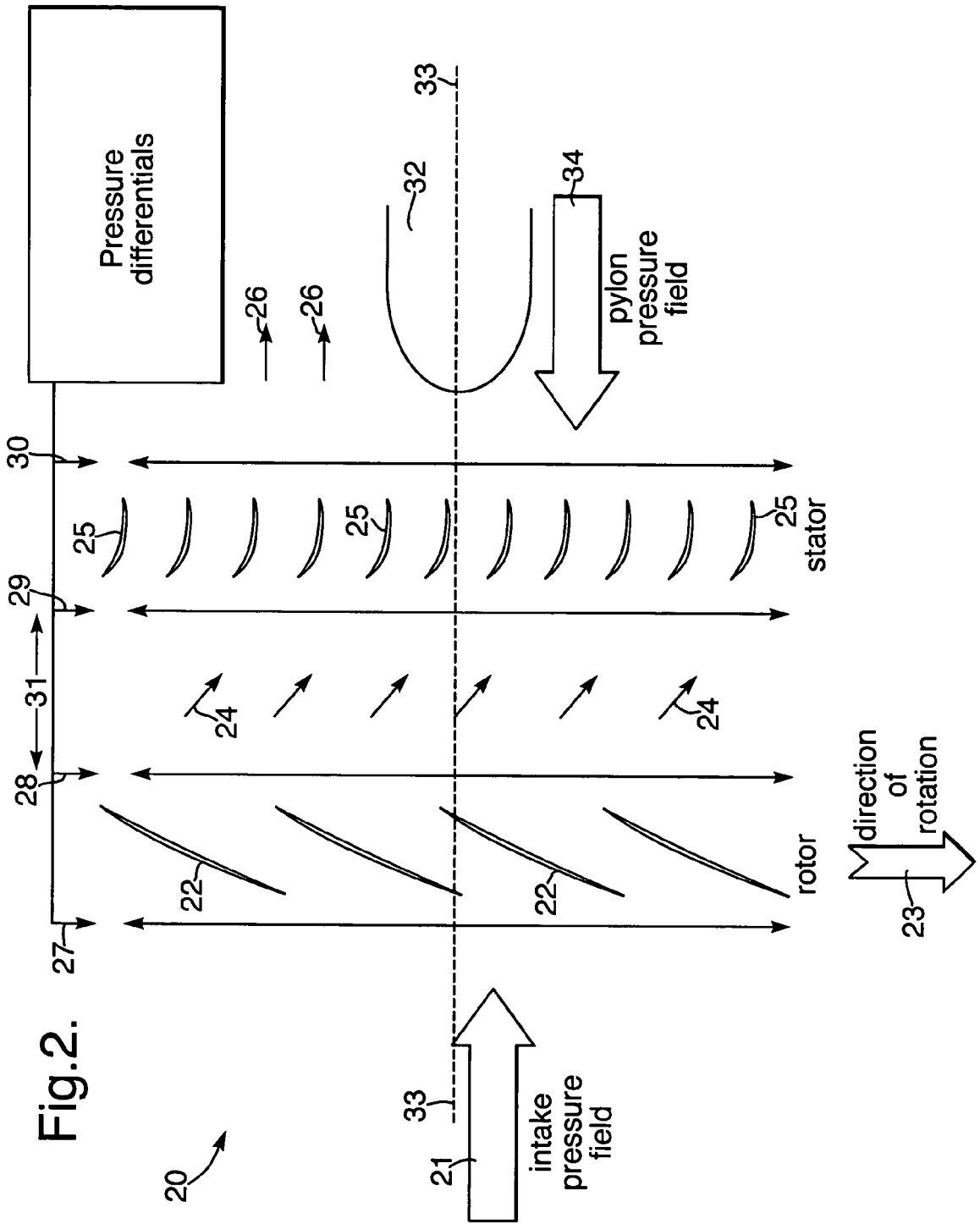

GAS TURBINE ENGINE INCLUDING STATOR VANES HAVING VARIABLE CAMBER AND STAGGER CONFIGURATIONS AT DIFFERENT CIRCUMFERENTIAL POSITIONS

FIELD OF THE INVENTION

The present invention relates to gas turbine engines and more particularly to fan arrangements to provide more efficient airflow.

BACKGROUND OF THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Particular problems occur with regard to the propulsive fan of the gas turbine engine. It will be appreciated that the propulsive fan draws air into the engine under low pressure and this air is propelled typically at an angle towards stator vanes within the engine in order to straighten the airflow. Unfortunately, as a result of several factors, there are problems associated with this basic relationship. Firstly, due to the nature of attaching a gas turbine engine to an aircraft wing, there is a so-called droop phenomena whereby the airflow is not presented parallel to the engine axis. This input effect upon presentation of the air flow to the air intake may be further compromised by side winds etc. Further problems relate to aerodynamic losses as a result of fan blade tip vortex phenomena and other factors. It will also be understood that there is a significant problem with respect to so-called fan forcing which is as a result of circumferential pressure variations around the air intake of the gas turbine engine such that each fan blade must force its way between these variations and this in turn causes stress to the fan blades. A further problem relates to the necessity to mount the gas turbine engine with a substantial mounting pylon just to the rear of the stator vanes and also provision of radial drive struts at similar positions. The pylon and radial drive struts further distort the laminar flow through the stator vanes. Typically, a pylon and/or radial drive struts will create a back pressure which acts prior to the stator vanes in order to further distort uniform laminar flow across the air intake for a gas turbine engine. It will be appreciated that there may be other forms of obstruction behind the vanes which create a back pressure.

Previously, attempts have been made to ameliorate the effects of back pressure due to pylons and radial drive struts to provide an equalisation of laminar flow presented through those stator vanes for the fan blades. In short, by either cyclic angle stagger, that is to say presenting the same type of stator vane but staggered at different angles relative to the flow, or by cyclic camber, that is to say different shaped vanes at different positions, laminar flow has been adjusted to achieve approximate uniformity across the region immediately upstream of the stator vanes. It will be appreciated by varying the vanes either by cyclic stagger or cyclic camber techniques, it is possible to adjust for the back pressure effects of pylons and/or radial drive struts. Nevertheless, specification of the appropriate cyclic stagger or cyclic camber variations in the stator vanes requires a detailed analytical model of airflow through the gas turbine engine fan inlet. This detailed analysis is complicated due to the high number of possible variables such that previously, modelling has been limited to the angular laminar flow presented by rotation of the airflow aerofoil blades of the fan to the stator vanes given particular pylon and/or radial drive strut configurations. In such circumstances, the most significant problem is that relating to fan forcing, the stator vanes positions have been optimised in order to minimise that problem such that droop/crosswinds have been neglected and such as other efficiency reducing problems aerodynamic losses and buffet flutter have been accepted as inherent operational consequences. Nevertheless, all these effects are modified by the presence of droop and/or crosswinds.

SUMMARY OF THE INVENTION

In accordance with the present invention there is provided a gas turbine engine comprising an intake, a low pressure compressor including a plurality of rotor blades arranged downstream of the intake, a plurality of stator vanes arranged downstream of the low pressure compressor and at least one obstruction arranged downstream of the stator vanes, whereby in use the at least one obstruction producing a circumferentially varying back pressure on the stator vanes and the intake supplying an airflow having a circumferentially varying forward flow pressure to the low pressure compressor due to a non-axisymmetric flow of air into the intake, the stator vanes are arranged to balance the circumferentially varying back pressure from the at least one obstruction with the circumferentially varying forward flow pressure from the intake at substantially all circumferential positions.

Also in accordance with the present invention, there is provided a gas turbine engine with momentum balance across a flow path whereby a plurality of stator vanes are relatively positioned to utilise any back pressure to adjust circumferentially forward pressure differentials for greater uniformity across the flow.

Possibly, the stator vanes are of the same configuration but the stator vanes different circumferential positions have different stagger angles. Additionally or alternatively, the stator vanes may be of different camber configuration at different circumferential positions.

Typically, the obstruction is a pylon or radial drive strut. Possibly, the pylon and/or radial drive strut may be shaped for desired back pressure reflection response.

BRIEF DESCRIPTION OF THE DRAWINGS

An embodiment of the present invention will now be described by way of example only with reference to the accompanying drawings in which:—

FIG. 2 is a schematic part cross-section of a gas turbine engine intake;

DETAILED DESCRIPTION OF THE INVENTION

Figure 1:
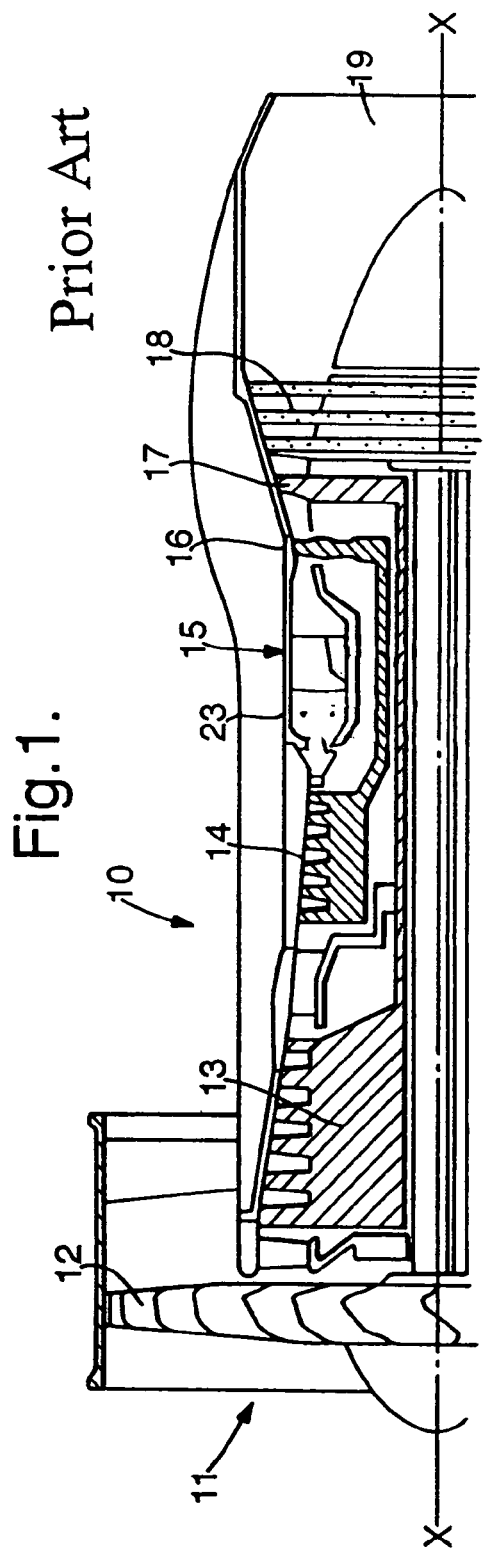
FIG. 1 is a schematic sectional side view of the upper half of a gas turbine engine.

The present invention relates to the design of an air intake for a gas turbine engine. This air intake is a low pressure compression system for an axial flow compressor in the engine. The low pressure compression system comprises the intake to the fan or compressor, the fan or compressor, the outlet guide vanes or stator vanes on the stator and any obstructions such as pylons used to support the engine upon an aircraft wing or struts used to enclose radial drives or other features which cause an upstream variation in pressure for example bleed ducts. As indicated above, there is an associated non-axisymmetric flow to the intake caused usually by droop in the airflow to the intake. It is also understood that non-axisymmetric flow in the low pressure system of a gas turbine engine generates a number of undesirable features. For example, at certain circumferential locations, there are localised regions of high Mach number flow on the stator vanes and localised regions of high stator vane incidence leading to regions of high loss and under extreme conditions to regions of stator vane flutter. Furthermore, non-axisymmetric flow both a head of and behind the driving fan can lead to high levels of fan forcing.

As indicated above, generally the stator vanes are adjusted in order to accommodate for these non-axisymmetric flows. It is possible to provide stator vane trailing edge recambering where only the trailing edges are modified and the leading edges of the stator vanes remain unaltered relative to the flow caused by the fan blade rotation. However, such cyclic cambering of the stator vanes necessitates providing different types of stator vane for different positions about the circumference of the intake with resultant higher costs in terms of stator vane manufacture and design. The alternative is to provide cyclic stator vane staggering wherein the trailing edge angles and leading edge angles of each stator vane are modified in situ by repositioning a desired amount in order to provide the necessary remedial effects with regard to non-axisymmetric flow. However, as a consequence when stator vanes are staggered, there will be a cyclic variation in the stator vane leading edge angles with a cyclic variation in stator vane incidence with consequential non-axisymmetric effects even when other detrimental factors such as obstructions (pylons) or inlet distortion are not present. Nevertheless, the advantage of cyclic staggering is that a single stator vane type can be used and the cyclic variation introduced by specific circumferential positional changes in individual stator vanes aspect angles set upon installation.

The present invention provides an intake for a gas turbine engine configured such that there is a plurality of stator vanes located with a non-axisymmetric relationship to counteract the effects imposed by non-axisymmetric flow upstream of the fan due to the factors outlined above and downstream of the stator vanes due to obstructions such as pylons and/or struts. By such choice, it is possible to specify an acceptable performance level and then provide a stator vane configuration to achieve that performance level in view of the detrimental effects described previously, that is to say inlet flow droop, aerodynamic losses, buffet flutter and fan forcing. Generally, an analytic process utilising an aerodynamic model known as an actuator disc is used to represent both the rotating fan and the stator outlet guide vanes of the stator. Since there are no fan blades in this model, the force cannot be determined by direct calculation, instead, the force on the fan is determined from a mathematical model based upon the momentum jump across the fan. The present invention utilises the situation that there are non-axisymmetric flows both ahead of and behind the fan. Thus, these respective forward pressures and backward pressures act against each other in order to approximate momentum balance. It should be understood that it is unlikely to be required to completely eliminate both the upstream (forward pressure) and the downstream (back pressure) generated flow asymmetries but nevertheless, it is possible in practice to achieve closer point to point balance in the flow asymmetries across the fan. Approaching balance results in aerodynamic flow which varies circumferentially both ahead of and behind the fan but which produces non, or significantly reduced, fan forcing because at each circumferential location, there is no or limited local momentum jump or disparity across the fan due to the balancing effect of the forward pressures and backward pressures as described.

The present invention considers and provides a gas turbine engine in which the whole inlet or intake system is considered including intake droop, fan rotation, outlet guide vanes, or stator vanes and downstream obstructions like pylons or struts. In considering these factors, a range of quantities including angle of incidence of flow onto the stator vanes is considered taking account of stagger for each stator vane, the Mach number, or flow speed, of the flow onto the stator vanes and the force on the fan. By such an approach, it is possible to vary both stator vane stagger and stator vane camber about the intake in order to reduce or achieve a desired operational performance criteria. It should be known that different types of stator vane camber are arranged in blocks and that constraints are specified by the user such as limitations upon the amount of stagger or camber allowed due to detrimental effects upon engine performance. In accordance with the present invention, it is possible to provide substantial momentum balance across the fan without eliminating the flow distortion produced by the obstructing pylon or struts.

Generally, the upstream non-axisymmetric effects due to inlet droop are generally fixed by design requirements for other engine performance objectives. Thus, in accordance with the present invention, it is by utilising the back pressure caused by obstructions such as pylons or struts for radial drives as well as judicious positioning of stator vanes that momentum balance is achieved. It is also necessary to consider fan to stator vane axial gap, the geometry of the obstruction pylons and any details of expected inlet distortion. Furthermore within this consideration, it will be appreciated it is necessary to deduce any limitations or constraints upon stator vane stagger or camber angles with respect to positioning etc as well as upper and lower limits for stagger/camber and the number of possible camber types so that a cost benefit analysis can be made with respect to improved flow performance in return for additional cost or added weight. It will also be understood that the analysis will generally use prioritising or weighting factors in order to specify the desired stator vane circumferential positioning. Nevertheless, the present invention by considering all aspects of low pressure intake systems in particular inclusion of intake droop effect, it is possible to provide more efficient flow control through a choice of both staggered and cambered stator vanes in order to achieve the objective amelioration of the significant detrimental effects of aerodynamic losses, buffet flutter and fan forcing. In such circumstances, it is possible to provide for substantial reduction or even elimination of fan forcing without removing the asymmetric nature of the aerodynamic flow by balancing momentum circumferentially at opposed point to point positions upstream and downstream of a fan through cancellation of the forward pressure created by certain configurational factors and back pressure caused by obstructions such as pylons.

As indicated above, the present invention considers the complete low pressure intake system of a gas turbine engine in terms of intake droop, fan, outlet guide vanes in the stator and downstream obstructions such as pylons or struts. Then by calculation of the range of qualities including the angle incidence of flow onto the stator vanes of the stator, taking account of stagger for each stator vane, the Mach number or flow speed onto the stator vanes and the force upon the fan and appropriate distribution positioning of stator vanes within the stator for stagger and camber is determined or modified from that existing at present in order to achieve the desired objectives. By achieving momentum balance across the fan, it is possible to reduce forcing upon the fan and therefore stress problems with the blades of that fan.

It will be appreciated that different stator vane configurations will be required for different intake situations. Thus, in accordance with the present invention, analysis will be made of the aerodynamic flow through the low pressure intake system in terms of the predicted non-axisymmetric flow. Subsequent to such analysis of the aerodynamic flow, investigations will be provided in order to form an optimisation of stator vanes design not in terms of detailed stator vane profiles, but in terms of the circumferential arrangement of stator vanes with variable individual stator vane stagger angle settings and/or stator vane trailing edge camber angle settings in order to achieve the desired operational performance in ameliorating the effects of fan forcing, aerodynamic losses, buffet flutter and intake droop. In such circumstances, through a combination of stagger and camber variation in stator vanes, optimisation of performance in terms of capabilities as well as with respect to weight and cost can be conducted. It will be understood that the necessary distinctive nature of camber angle variation renders such stator vanes typically as more expensive than common stator vanes with individual stagger angle settings. In such circumstances, where cyclic variations in stagger are used, it will be understood that all the stator vanes may be staggered independently even though all the stator vanes are of a single type. With cyclic variations in trailing edge camber more than one stator vane type is used but in order to reduce overall costs, groups of such stator vanes may be assembled into common segments or selected stator vane member configuration groups in order to provide the desired response. Thus, in summary a designer of stator vane assemblies can provide cyclic stagger, cyclic trailing edge camber or a combination of stagger and camber in order to achieve the desired results.

Generally, the modelling of fluid flow as indicated will be such that the desired operational target may be to optimise performance in respect of any of the following:

(a) Circumferential variation in flow angle (direction) rejected from the fan towards the stator vanes leading edge.
(b) Circumferential variation in flow Mach number or flow speed at the stator vane leading edge.
(c) Circumferential variation in flow incidence angle at the stator vane leading edge. It will be understood that the incident angle is the difference between the flow angle and the stator vane aspect leading edge angle in service.
(d) Circumferential variation in force on the fan during rotation as a result of pressure differentials across that fan.
(e) Any combination of priority or weighting of the above objectives (a) to (d).

As indicated above generally, the most detrimental effect is fan forcing due to the inherent stressing of the fan blades in operation. Thus generally, objective d) which is to eliminate fan forcing or at least reduce it will be the priority objective in use. Nevertheless, this reduction in fan forcing will be achieved without removing non-axisymmetric features of the flow. Instead, the flow field behind the fan is modified so that the local momentum values behind the fan at each circumferential location are the same as or close in appropriate value to the forward pressure in front of the fan at a similar position or location. This modification and balance of the flow field arises from the manipulation of the stator vane stagger and/or camber angles within the stator part of the low pressure intake system for the gas turbine engine.

The analytic process utilises an actuator disc to represent the fan rotor blades and another actuator disc to represent the stator vanes. An actuator disc is a model for a stage of fan rotor blades, or a stage of stator vanes, that does not require the detailed aerofoil geometries, of the stage of fan rotor blades or of the stage of stator vanes, but represents the change in aerodynamic quantities across the stage of fan rotor blades or the stage of stator vanes, from upstream of the stage of fan rotor blades, or the stage of stator vanes, to downstream of the stage of fan rotor blades, or the stage of stator vanes. These changes in aerodynamic quantities may vary circumferentially, eg non-axisymmetrically, to allow for variations in the aerodynamic flow field and the local fan rotor blade exit angle or local stator vane exit angle.

In order to link the actuator disc models of the fan rotor blades and stator vanes to the aerodynamic flows upstream of the fan rotor blades and downstream of the stator vanes it is necessary to have details of the circumferentially non uniform flow field upstream of the fan rotor blades and to have details of the circumferentially non uniform flow field downstream of the stator vanes. Therefore, separate calculations, or tests, are used to determine, or to provide, data of the circumferentially non uniform flow field through the intake, upstream of the fan rotor blades, in the absence of the fan rotor blades, stator vanes and obstructions downstream of the stator vanes. Similarly, separate calculations, or tests, are used to determine, or to provide, data of the circumferentially non uniform flow field through the duct caused by the obstructions, downstream of the stator vanes, in the absence of the fan rotor blades, stator vanes and intake. These two calculations, or tests, provide the non-axisymmetric boundary conditions upstream of the fan rotor blade actuator disc and downstream of the stator vanes actuator disc.

The actuator disc calculations account for the changes to the upstream and downstream aerodynamic flow field, caused by the presence of the fan rotor blades and stator vanes. These changes to the upstream and downstream aerodynamic flow fields are dependent upon the stator vane configuration. The actuator disc calculations account for the changes to the upstream aerodynamic flow field and the downstream aerodynamic flow field, whatever the stator vane configuration, it is not necessary to recalculate the circumferentially non uniform flow field through the intake upstream of the fan rotor blades or to recalculate the circumferentially non uniform flow field through the duct downstream of the stator vanes during the optimisation process.

To determine an appropriate non axisymmetric stator vane arrangement the objective of the optimisation process is specified and the variables to be used to produce the optimisation are specified. The objective is an aerodynamic 'cost function', formed from a weighted combination of the fan force, a measure of the incidence of the flow onto the stator vanes and a measure of the speed of the flow onto the stator vanes. The variables are either the stator vane stagger angles, the stator vane trailing edge camber angles or a combination of stator vane stagger angles and stator vane trailing edge camber angles. The weighting may be changed to focus the optimisation just on fan force at the expense of high incidence and flow speeds, just on stator vane incidence at the expense of high fan force or a balance of these three important quantities. As the weighting is changed, so is the resulting non axisymmetric stator vane arrangement. A standard optimiser is used to solve for the flow around the two actuator discs, varying the non axisymmetric stator vane arrangement at each iteration.

It is important to note that the reduction, or elimination of fan force is obtained not by removing the flow asymmetries from the struts and/or pylons that pass in an upstream direction through the stator vanes, because the inlet flow asymmetry still produces forcing on the fan. The present invention uses a 'force balance' concept to balance the local momentum jump between the upstream end and downstream end of the fan. The 'force balance' is achieved by selecting stator vane stagger angles, stator vane camber angles or a combination of stator vane stagger angles and stator vane camber angles that produce a flow field downstream of the fan which matches the flow field upstream of the fan, in terms of the local momentum of the flow. The result is a circumferential variation in the flow field both upstream of the fan and downstream of the fan, but no, or significantly reduced, fan force.

The stator vane incidence governs losses, eg fuel consumption, the flow speed governs losses and buffet flutter and the fan force governs fan stress.

In the aerodynamic 'cost function' for fan force the harmonics of engine order to be included are selected, for speed of flow and stator vane incidence the root-mean-square value of the circumferential variation is used.

FIG. 2 provides a schematic part cross-section of a low pressure intake system for a gas turbine engine. Thus, an intake pressure field 21 is presented to fan rotor blades 22 of the engine which in turn rotate in the direction 23 in order to generate airflow in the direction of arrowheads 24 towards stator vanes 25 of a stator assembly within an engine. As can be seen, the forced airflow 24 is angled due to the compression of fan rotor blade 22 rotation in the direction 23 such that the stator vanes 25 act to straighten the flow in the direction of arrowheads 26 towards subsequent stages of a gas turbine engine.

As indicated previously, there are circumferential variations in pressure, flow angle, flow speed and other factors at respectively different positions 27, 28, 29, 30 within the low pressure intake 20 at the front of the fan formed by fan rotor blades 22. As indicated at position 27 there may be a so called droop effect whereby the airflow 21 into the intake 20 is not presented parallel to the engine axis such that there are pressure variations across intake 20. There may also be factors with respect to cross-winds in operation to the airflow 21 which similarly effect in form air flow 21 presentation at position 27. With respect to locations 28, 29 it will be understood that there are circumferential variations about the circumference of the intake with resultant imbalance across the fan formed by fan rotor blades 22. These variations may be due to airflow reflection upon impingement with the stator vanes 25 and so the relative distance 31 between the trailing edges of the rotor blades 22 and the leading edges of the stator vanes 25 can be a factor with respect to the seriousness of the circumferential variation with respect to engine performance. Clearly, the narrower the distance 31 generally, the greater this reflective effect will be. Downstream of the stator vanes 25, one or more pylons 32 are located which again by way of reflected backwash creates non-axisymmetric pressure variations about the circumference of the rotor. It will be appreciated that the pylon 32 is normally located centrally vertically above the axis of rotation 33 about which the rotor blades 22 are rotated in order to generate the flow 24. In some cases, the pylon may extend horizontally. In such circumstances, the pylon 32 creates a back pressure in the direction of arrowhead 34 through the stator vanes 25 which impinges upon the flow 24 in order to create further circumferential variations about the intake.

Figure 3:
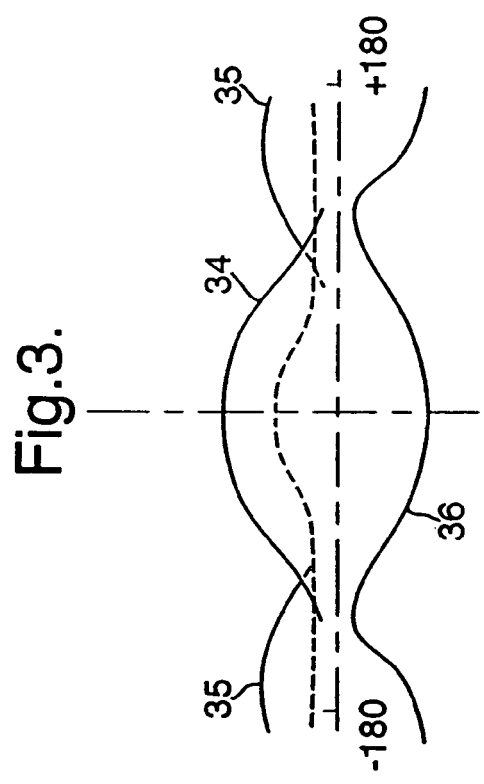
FIG. 3 is a simplified graphic representation of aggregate forward pressure and back pressure.

FIG. 3 is a simplified graphical illustration depicted for a 360° circumference centred upon the pylon 32 possible responses for that pylon 32 along with a strut for a radial drive (not shown). Thus, a line is provided and representative of back pressure 34 due to the pylon 32 whilst lines 35 are representative of the back pressure due to a strut for a radial drive (not shown) in FIG. 2. The line 36 is representative of the aggregate effects of intake droop, which is circumferentially varying as indicated by that line 36. Thus, forward pressure generally depicted by line 36 is opposed by the back pressures depicted by lines 34, 35 such that generally the non-axisymmetric effect of the pylon 32 is retained about the central portion whilst the momentum is balanced by the opposing forward pressure 36 and back pressures 34, 35 for reduced cyclic variations at substantially all positions throughout the circumference which in turn will prevent fan forcing and so reduce stressing upon those fan rotor blades 22.

In order to achieve this matching between the forward pressures 36 and the back pressures 34, 35, it is necessary for the stator vanes 25 of the stator to be appropriately circumferentially positioned either in terms of stagger or camber of the trailing edge whereby as far as possible, the opposing forward and backward pressures are controlled to cancel each other. As indicated above, the specific positioning of these stator vanes 25 in the stator will be determined from analysis of the flow through the intake 20 for appropriate matching between the forward force 36 circumferential variation with the back pressure created by the pylon 32 and/or struts (not shown). As indicated normally, the most detrimental factor will be principally utilised as the operational objective to be ameliorated by stator vane positioning. This factor is normally fan forcing or alternate acceleration and deceleration of the fan rotor blades 22 between localised pressure differentials about the circumference.

Figure 4:
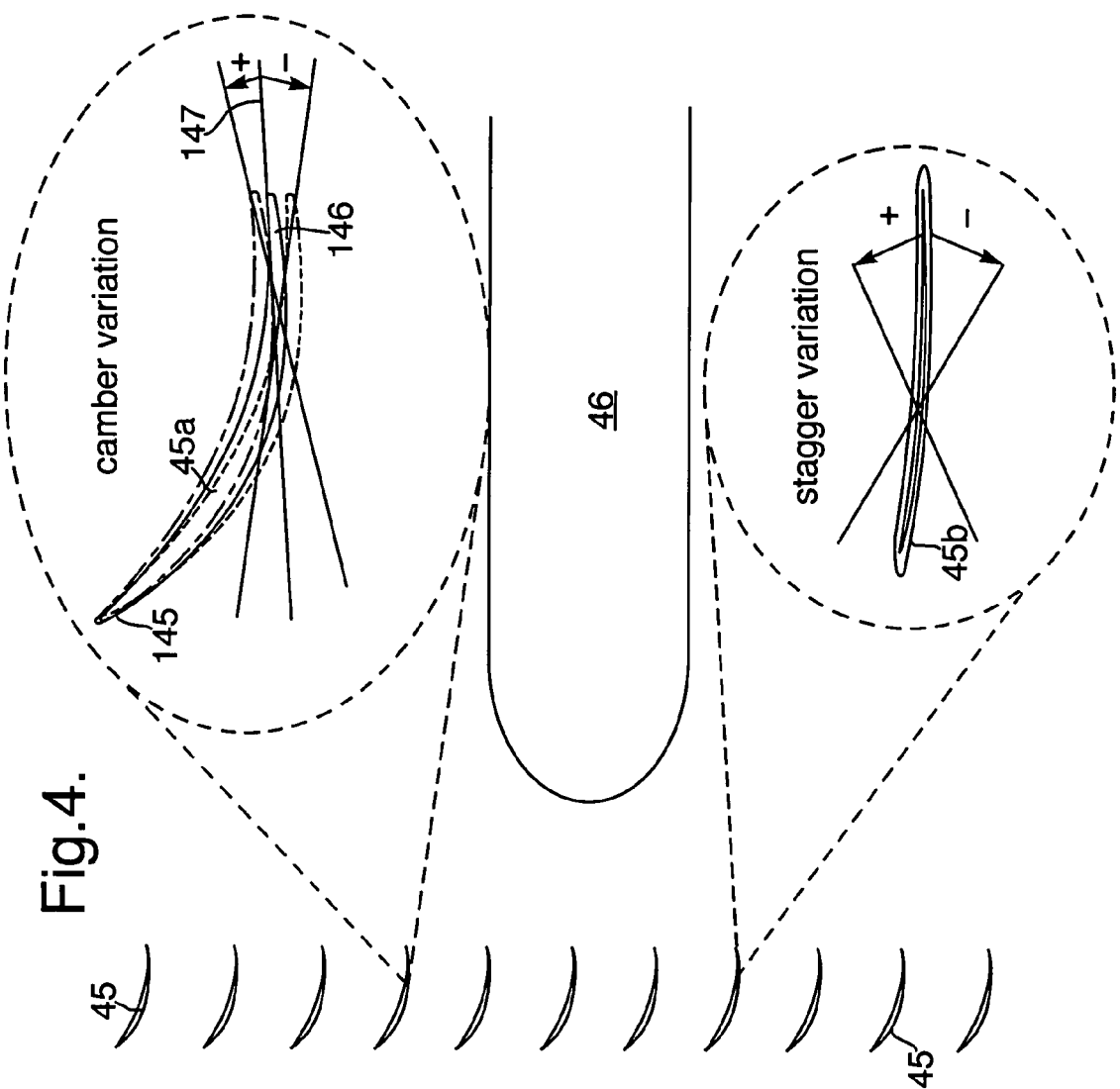
FIG. 4 is a schematic illustration of an intake similar to that depicted in FIG. 2 with greater detail as to stator vane configuration.

FIG. 4 is a more detailed schematic cross-section of an intake for a gas turbine engine in accordance with the present invention. Thus, fan rotor blades 42 are again arranged to rotate in order to generate an airflow 44 towards stator vanes 45. A pylon 46 is located immediately downstream of the stator vanes 45 in the stator. As indicated above, these stator vanes 45 are positionally arranged about the circumference of the stator in the intake 40 in order to straighten the airflow 44 for presentation to subsequent stages of the gas turbine engine. Nevertheless, in accordance with the present invention, these stator vanes 45 are more importantly positioned in order to provide momentum balance across the fan rotor blades 42 by utilising back pressure from the pylon 46 as a reflective obstruction to balance the forward pressure caused by factors such as intake droop and/or crosswind.

In accordance with the present invention, the stator vanes 45 may take the form of a camber variation of the stator vanes 45a or a stagger variation of the stator vane 45b. By a combination of these stator vanes 45a, 45b, the present invention provides the appropriate momentum balance between the forward pressures and the back pressures to substantially ameliorate the detrimental factors as described above with respect to buffet flutter, aerodynamic losses and fan forcing.

Camber variation relates to providing different stator vane 45a shapes and configurations in which the leading edge 145 is consistent whilst the trailing edge 146 is altered positively or negatively about a median camber angular presentation 147 in order to adjust the flow characteristics of the stator vane 45a. As indicated previously, provision of different stator vane 45a configurational types is costly. Nevertheless, in order to reduce costs normally, a number of consistently shaped type stator vanes 45a will be associated in a bank arrangement or group for appropriate effect in the desired response model to achieve the flow objective or objectives designated.

With regard to stagger variation, it will be understood that the stator vanes 45b are consistently shaped such that there is no variation in that shape and the stator vanes 45b are therefore cheaper. However, these stator vanes 45b are varied in stagger angular presentation in a plus or minus orientation about a particular pivot point upon the stator vane 45b. In such circumstances, the flow characteristics of the stator vane 45b within the stator can be adjusted within acceptable limits.

In the above circumstances, by altering stator vane camber and/or stagger and possibly the gaps between stator vanes it is possible to provide the desired momentum balance across the fan formed by the fan rotor blades 42 whilst retaining the non-axisymmetric flow characteristics due to the pylon 46 for subsequent engine stages.

By balancing the forward and back pressures when in the intake, it is possible to more conveniently achieve an objective such as fan forcing reduction than by simple analytical modelling of the fan forcing effect directly between the flow 24, 44 upon the stator vanes 25, 45. Considering the overall effect of the upstream forward pressure generated by intake droop with back pressure caused by pylon obstructions, it is possible to simplify the analysis for limitation of fan forcing.

Figure 5:
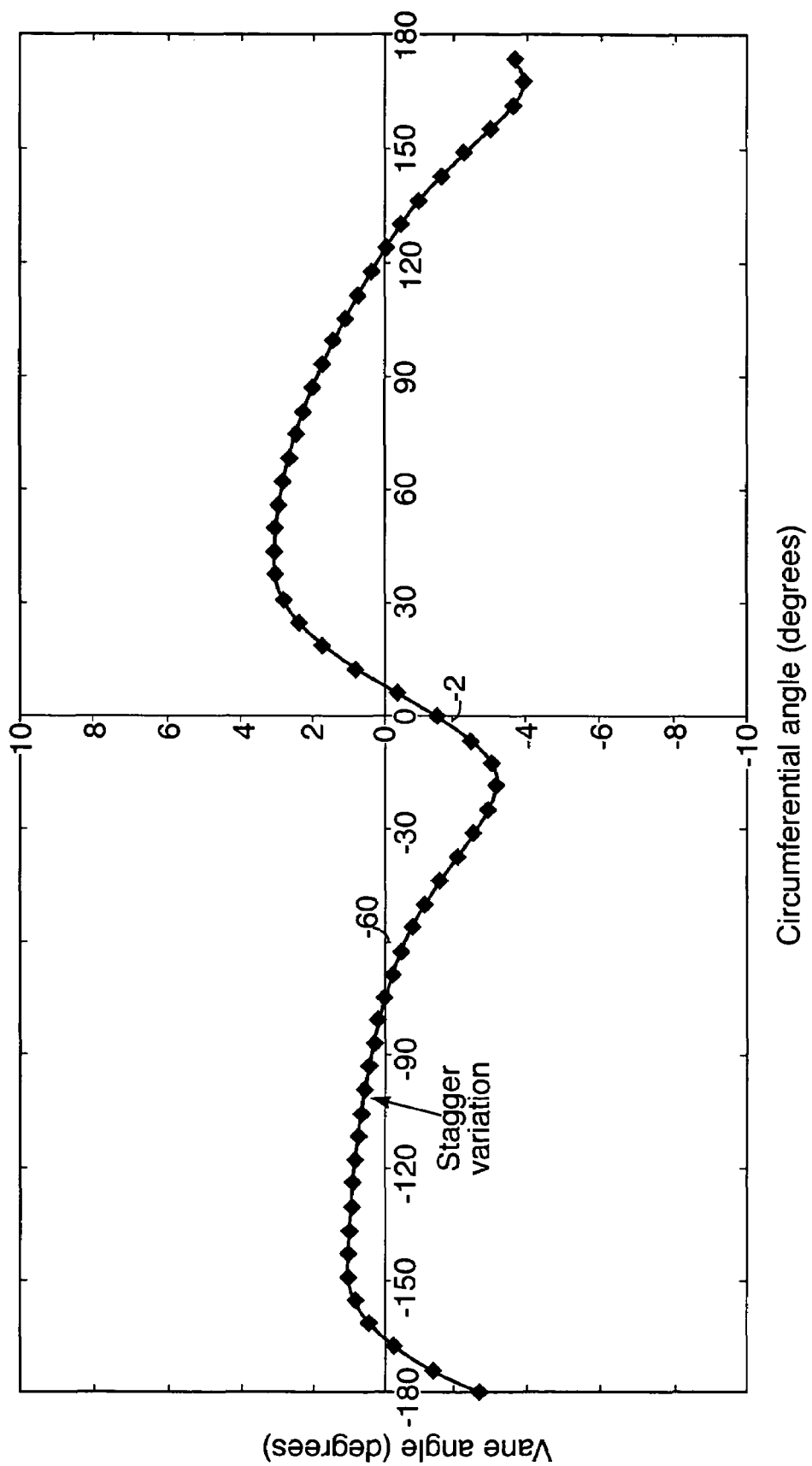
FIG. 5 is a graph showing the vane angle of the stator vanes with circumferential position for a first embodiment according to the present invention.

FIG. 5 shows an arrangement of stator vanes in which the stagger angle of the stator vanes is varied circumferentially to balance the circumferentially varying back pressure from obstructions downstream of the stator vanes with the circumferentially varying forward pressure from the intake at all circumferential positions. In this arrangement there are fifty eight stator vanes. The zero circumferential angle position corresponds to the position of the pylon and the 180° circumferential angle position corresponds to a position diametrically opposite the pylon, at which position a strut for a radial drive shaft is provided. The pylon may be arranged vertically above the axis of rotation of the fan rotor blades. It is seen that a first stator vane is arranged at the zero circumferential angle position and has a stagger angle of about −1.5° relative to a datum angle (0°) orientation. The stagger angle of the stator vanes increases to a maximum of about +3° relative to the datum orientation at the eighth stator vane, at a circumferential angle position of about +42°, and then the stagger angle decreases to the datum angle at the twenty first stator vane, at a circumferential angle position of about +124°. The stagger angle then decreases to a minimum of about −4° relative to the datum at the twenty eighth stator vane, at a circumferentially angle position of about +168°. The thirtieth stator vane is diametrically opposite the first stator vane and has a stagger angle of about −2.8° relative to the datum. The stagger angle increases to a maximum of about +1° at the thirty fifth/thirty sixth stator vane, at a circumferential angle of −156°/−150°. The stagger angle decreases to the datum angle at the forty seventh stator vane, at a circumferential angle of about −75°. The stagger angle then decreases to a minimum of about −3.2° relative to the datum angle at the fifty sixth stator vane at a circumferential position of −18°.

Figure 6:
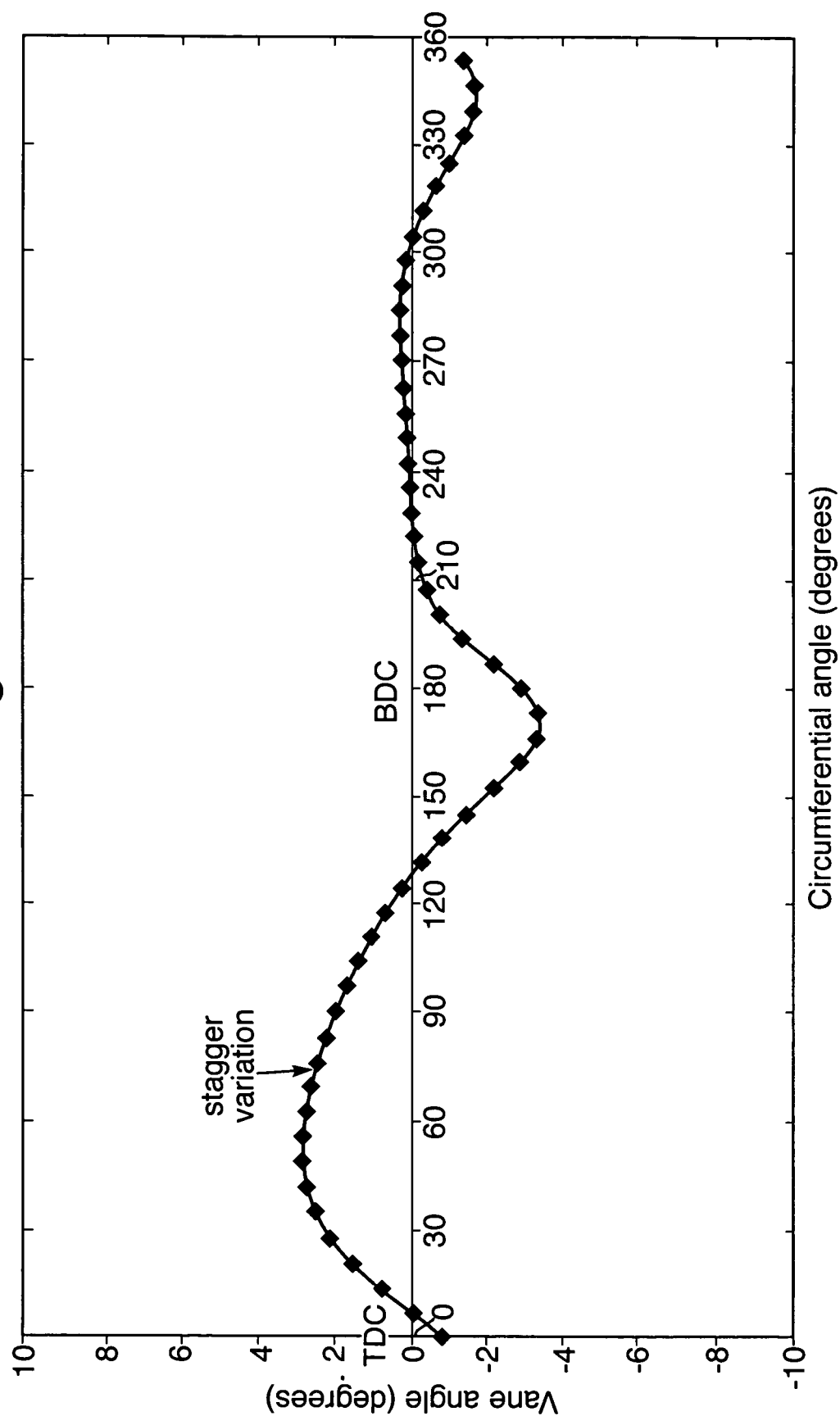
FIG. 6 is a graph showing the vane angle of the stator vanes with circumferential position for a second embodiment according to the present invention.

FIG. 6 shows a further arrangement of stator vanes in which the stagger angle of the stator vanes is varied circumferentially to balance the circumferentially varying back pressure from obstructions downstream of the stator vanes with the circumferentially varying forward pressure from the intake at all circumferentially positions. In this arrangement there are fifty two stator vanes. The zero and 360° circumferential angle position corresponds to the position of the pylon and the 180° circumferential angle position corresponds to a position diametrically opposite the pylon, at which position a strut for a radial drive shaft is provided. The pylon may be arranged vertically above the axis of rotation of the fan rotor blades. It is seen that a first stator vane is arranged at the zero circumferential angle position and has a stagger angle of about −1° relative to a datum angle (0°) orientation. The stagger angle of the stator vanes increases to a maximum of about +3° relative to the datum orientation at the eighth/ninth stator vane, at a circumferential angle position of 49°/56°. The stagger angle then decreases to a minimum of about −3.5° at the twenty sixth stator vane at a circumferential angle position of 173°. A twenty seventh stator vane is arranged at the circumferential angle position of 180° and has a stagger angle of about −3° relative to the datum. The stagger angle increases to a maximum of about +0.3° at the forty first stator vane at a circumferential angle position of 277°, although the stagger angle at the thirty fourth stator vane is at the datum angle. The stagger angle decreases from the forty first stator vane to the datum angle at the forty fourth stator vane at a circumferential angle position of 297°. The stagger angle then reduces to a minimum of about −1.7° at the fifty first stator vane at a circumferential angle position of 346°.

Figure 7:
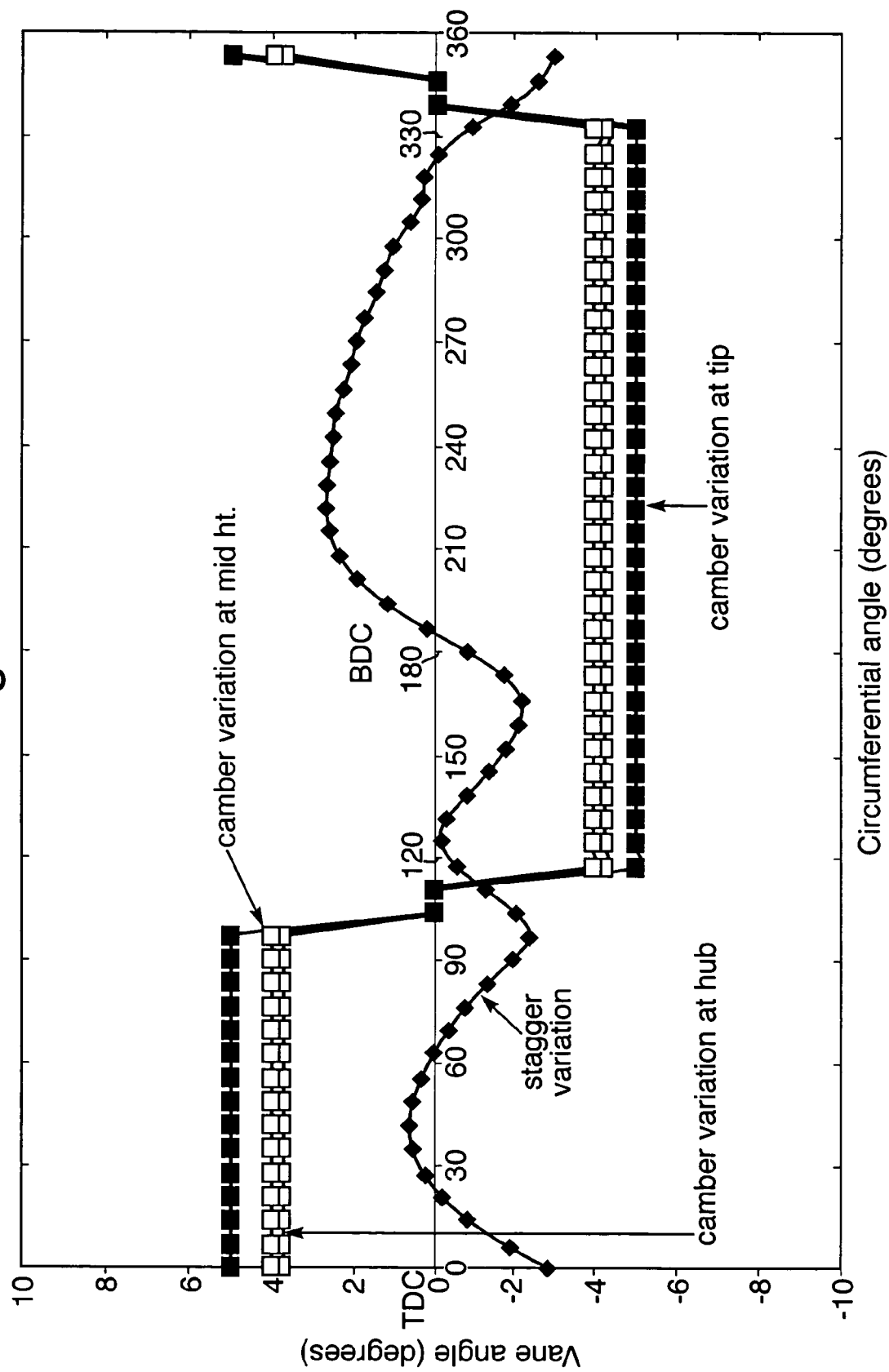
FIG. 7 is a graph showing the vane angle and vane camber of the stator vanes with circumferential position for a third embodiment according to the present invention.

FIG. 7 shows an arrangement of stator vanes in which the stagger angle and the camber angle of the stator vanes is varied circumferentially to balance the circumferentially varying back pressure from obstructions downstream of the stator vanes with the circumferentially varying forward pressure from the intake at all circumferential positions. In this arrangement there are also fifty two stator vanes. The zero circumferential angle position corresponds to the position of the pylon and 180° circumferential angle position corresponds to a position diametrically opposite the pylon, at which position a strut for a radial drive shaft is provided. The pylon may be arranged vertically above the axis of rotation of the fan rotor blades. A first stator vane is arranged at the zero circumferential angle position and has a stagger angle of about −3° relative to a datum angle (0°). The stagger angle increases to a maximum of about +0.5° at the seventh stator vane at a circumferential angle position of 49°. The stagger angle then decreases to the datum angle at the tenth stator vane at a circumferential angle position of 63°. The stagger angle further decreases to a minimum of about −2.5° at the fifteenth stator vane at a circumferential angle position of about 98°. The stagger angle then increases to a maximum of about −0.25° at the nineteenth stator vane at a circumferential angle position of 124°. The stagger angle decreases to a minimum of −2.25° at the twenty fifth stator vane at a circumferential angle position of 166°. The twenty seventh stator vane is diametrically opposite the first stator vane and has a stagger angle of about −1°. The stagger angle then increases to a maximum of about 2.6° at the thirty third/thirty fourth stator vane at a circumferential angle position of 222°/229°. The stagger angle decreases to the datum angle at the forty eighth stator vane at a circumferential angle position of 325°. The stagger angle then decreases to a minimum of about −3° at the first stator vane. The camber angle at the tip for the first to fifteenth and fifty second stator vanes is about 5°, the camber angle at the mid height for the first to fifteenth and fifty second stator vanes is about 4° and the camber angle at the hub for the first to fifteenth and fifty second stator vanes is about 4°. The camber angle at the tip, mid height and hub for the sixteenth, seventeenth, fiftieth and fifty first stator vanes is the datum angle 0°. The camber angle at the tip for the eighteenth to forty ninth stator vanes is −5°, the camber angle at the mid height for the eighteenth to forty ninth stator vanes is about −4° and the camber angle at the hub for the eighteenth to forty ninth stator vanes is about −4°. The camber is increased at the tip to reduce fan force and the camber is reduced at hub to reduce buffet flutter. The datum angle and plus and minus angles in FIGS. 5 to 7 are as described with reference to FIG. 4.

Figure 8:
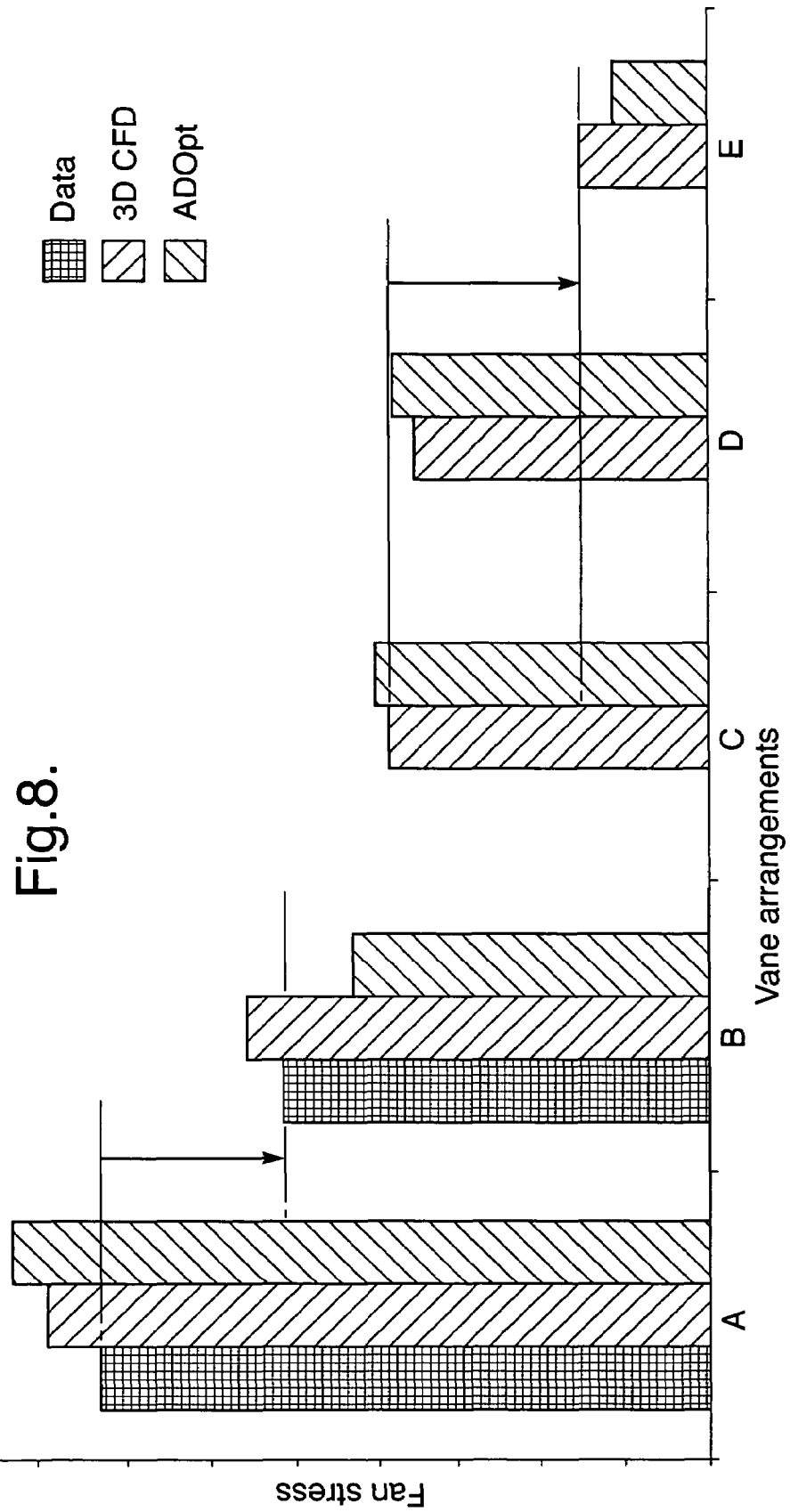
FIG. 8 is a bar chart showing the fan forcing level, or fan stress levels, for five different stator vane arrangements as measured, as predicated by CFD and as predicted by the present invention.

FIG. 8 shows the fan force levels for five different stator vane arrangement, as measured, as predicted by computational fluid dynamics (CFD) and as predicted by the present invention (ADOpt). Stator vane arrangement A has conventional stator vane stagger angles, stator vane arrangement B is a modification of stator vane arrangement A and corresponds to that shown in FIG. 5. It is clearly seen from arrangements A and B that the modification produced to the stator vanes produced by the present invention by balancing the forward pressure and backward pressure reduces the fan stress by about a third. Stator vane arrangement C has a conventional uniform stagger angle, stator vane arrangement D is a modification of stator vane arrangement C and corresponds to that shown in FIG. 6 and stator vane arrangement E is a modification of stator vane arrangement C and corresponds to that shown in FIG. 7. It is clearly seen from arrangements C and E that the modification produced to the stator vanes produced by the present invention by balancing the forward pressure and backward pressure reduces the fan stress by about two thirds to three quarters.

Figure 9:
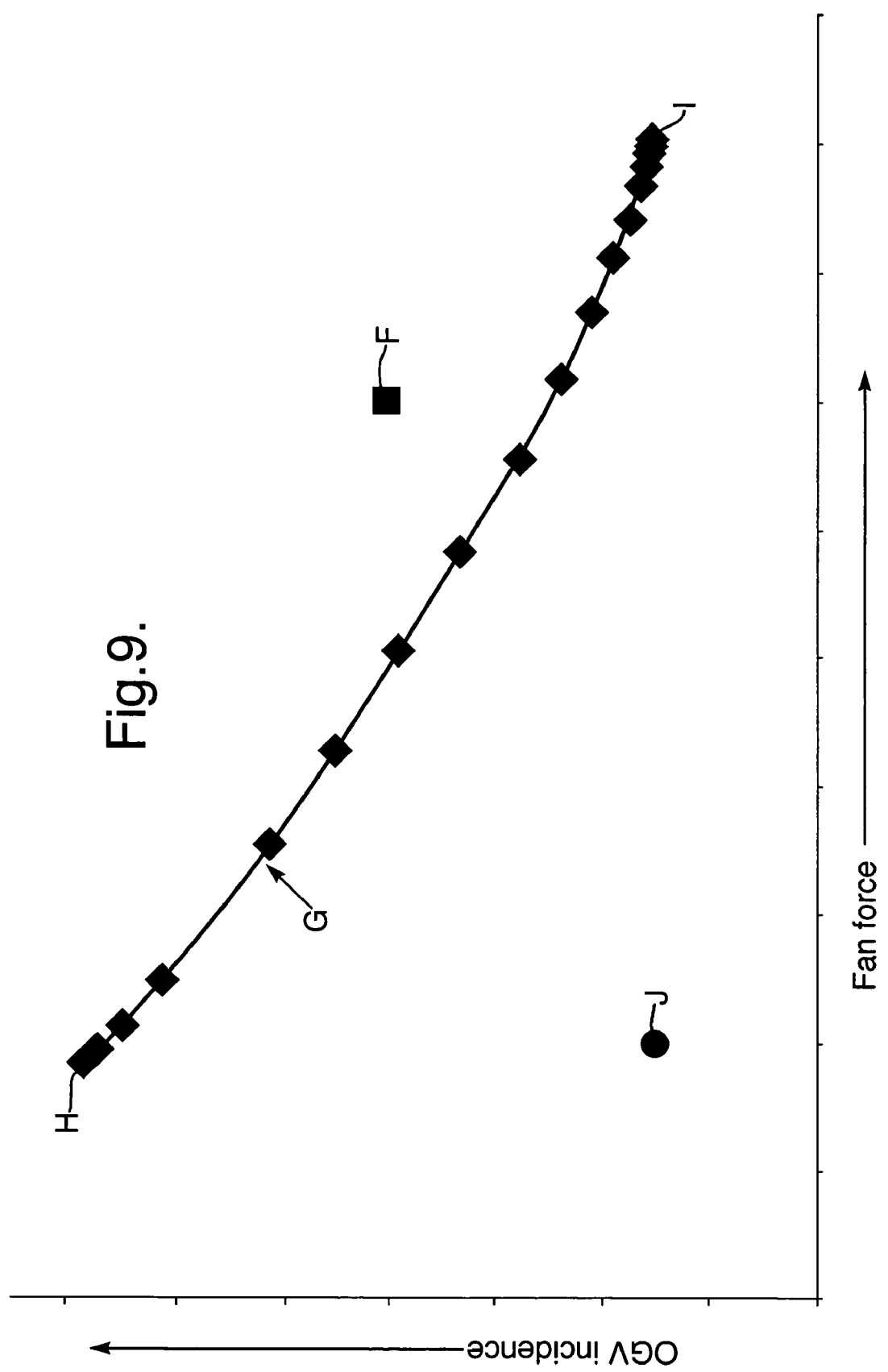
FIG. 9 is a graph showing a 'Pareto Front' with fan force and with different weighting.

FIG. 9 shows a 'Pareto Front' G produced by changing the force/incidence weighting (or levels of importance) during optimisation for changes to the stagger angle only. Different stagger angle settings circumferentially around the stage of stator vanes are obtained for each calculation and as a result different fan force/incidence results are achieved. Moving along the 'Pareto Front' G towards point H lowers the fan force at the expense of high incidence and hence high losses, eg high fuel consumption. Moving along the 'Pareto Front' G towards point I lowers the incidence at the expense of high fan force. Point F corresponds to a stator vane arrangement with uniform stagger angle corresponding to stator vane arrangement C in FIG. 8. Point J corresponds to a stator vane arrangement with stagger angle and camber angle varied circumferentially to balance the back pressure and the forward pressure corresponding to stator vane arrangement E in FIG. 8 and the stator vane arrangement shown in FIG. 7. Thus it can be seen that the stator vane arrangement J has much reduced fan force (two sevenths) and much reduced stator vane incidence (three eighths) compared to the stator vane arrangement F with uniform stager angle. The stator vane arrangement J has a fan force level corresponding to that of point H on the 'Pareto Front' G with a stator vane incidence level corresponding to that of point I on the 'Pareto Front' G. Thus the 'Pareto Front' G moves from point H where the fan force has the largest weighting to point I where the vane incidence has the largest weighting and points between have different weightings of fan force and vane incidence.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A gas turbine engine comprising an intake, a low pressure compressor including a plurality of rotor blades arranged downstream of the intake, a plurality of stator vanes arranged downstream of the low pressure compressor and at least one obstruction arranged downstream of the stator vanes, whereby in use the at least one obstruction produces a circumferentially varying back pressure on the stator vanes and the intake supplies an airflow having a circumferentially varying forward flow pressure to the low pressure compressor due to a non-axisymmetric flow of air into the intake, the stator vanes being arranged to balance the circumferentially varying back pressure from the at least one obstruction with the circumferentially varying forward flow pressure from the intake at substantially all circumferential positions, said stator vanes having variable camber and stagger configurations at different circumferential positions so as to balance the varying back pressure caused by the said at least one obstruction.

2. A gas turbine engine comprising an intake, a low pressure compressor including a plurality of rotor blades arranged downstream of the intake, a plurality of stator vanes arranged downstream of the low pressure compressor and at least one obstruction arranged downstream of the stator vanes, whereby in use the at least one obstruction produces a circumferentially varying back pressure on the stator vanes and the intake supplies an airflow having a circumferentially varying forward flow pressure to the low pressure compressor due to a non-axisymmetric flow of air into the intake, the stator vanes being arranged to balance the circumferentially varying back pressure from the at least one obstruction with the circumferentially varying forward flow pressure from the intake at substantially all circumferential positions, wherein the stator vanes at different circumferential positions have different stagger angles.

3. A gas turbine engine as claimed in claim 2 wherein the stator vanes are of the same configuration.

4. A gas turbine engine as claimed in claim 2, wherein the obstruction is a pylon or a radial drive strut.

5. A gas turbine engine as claimed in claim 4, wherein the pylon and/or radial drive strut is shaped for desired back pressure reflection response.

6. An aircraft having a gas turbine engine as claimed in claim 2 wherein the stator vane stagger angles and the stator vane camber angles are arranged such that a flow field downstream of the low pressure compressor matches a flow field upstream of the low pressure compressor, wherein the stator vane arrangement comprising fifty two equi-circumferentially spaced stator vanes, the stator vanes at different circumferential positions have different stagger angles, the at least one obstruction comprising a pylon at a first circumferential position and a strut at a second diametrically opposite position, a first stator vane is arranged upstream of the pylon and has a stagger angle of −3° relative to a datum angle, a seventh stator vane is arranged at a circumferential angle position of 49° from the first stator vane, the seventh stator vane has a stagger angle of +0.5° relative to the datum angle, a tenth stator vane is arranged at a circumferential angle position of 63° from the first stator vane, the tenth stator vane has a stagger angle corresponding to the datum angle, a fifteenth stator vane is arranged at a circumferential angle position of 98° from the first stator vane, the fifteenth stator vane has a stagger angle of −2.5° relative to the datum angle, a nineteenth stator vane is arranged at a circumferential angle position of 124° from the first stator vane, the nineteenth stator vane has a stagger angle −0.25° relative to the datum angle, a twenty fifth stator vane is arranged at a circumferential angle position of 166° from the first stator vane, the twenty fifth stator vane has a stagger angle of −2.25° relative to the datum angle, a twenty seventh stator vane is arranged at a circumferential angle position of 180° from the first stator vane, the twenty seventh stator vane has a stagger angle of −1° relative to the datum angle, a thirty third and/or a thirty fourth stator vane is arranged at a circumferential angle position of 222°/229° from the first stator vane, the thirty third and/or the thirty fourth stator vane has a stagger angle of +2.6° relative to the datum angle, a forty eighth stator vane is arranged at a circumferentially angle position of 325° from the first stator vane, the forty eighth stator vane has a stagger angle corresponding to the datum angle.

7. An aircraft having a gas turbine engine as claimed in claim 2 wherein the camber angle at the tip of the stator vane for the first to fifteenth and fifty second stator vane is about +5° relative to the datum angle, the camber angle at the mid height of the stator vane for the first to fifteenth and fifty second stator vane is about +4° relative to the datum angle, the camber angle at the hub of the stator vane for the first to fifteenth and fifty second stator vane is about +4° relative to the datum angle, the camber angle at the tip of the stator vane for the sixteenth, seventeenth, fiftieth and fifty first stator vane is the datum angle, the camber angle at the mid height of the stator vane for the sixteenth, seventeenth, fiftieth and fifty first stator vane is the datum angle, the camber angle at the hub of the stator vane for the sixteenth, seventeenth, fiftieth and fifty first stator vane is the datum angle, the camber angle at the tip of the stator vane for eighteenth to forty ninth stator vanes is about −5° relative to the datum angle, the camber angle at the mid height of the stator vane for the eighteenth to forty ninth stator vanes is about −4° relative to the datum angle, the camber angle at the hub of the stator vane for the eighteenth to forty ninth stator vanes is about −4° relative to the datum angle.

8. An aircraft having a gas turbine engine as claimed in claim 2 wherein the pylon is vertically above an axis of rotation of the low pressure compressor.

9. An aircraft having a gas turbine engine as claimed in claim 2 wherein the stator vane stagger angles and the stator vane camber angles are arranged such that a flow field downstream of the low pressure compressor matches a flow field upstream of the low pressure compressor, wherein the stator vane arrangement comprising fifty two equi-circumferentially spaced stator vanes, the stator vanes at different circumferential positions have different stagger angles, the at least one obstruction comprising a pylon at a first circumferential position and a strut at a second diametrically opposite position, a first stator vane is arranged upstream of the pylon and has a stagger angle of −1° relative to a datum angle, an eighth and/or ninth stator vane is arranged at a circumferential angle position of 49°/56° from the first stator vane, the eighth and/or ninth stator vane has a stagger angle of +3° relative to the datum angle, a twenty sixth stator vane is arranged at a circumferential angle position of 173° from the first stator vane, the twenty sixth stator vane has a stagger angle of −3.5° relative to the datum angle, a twenty seventh stator vane is arranged at a circumferential angle position of 180° from the first stator vane, the twenty seventh stator vane has a stagger angle of −3° relative to the datum angle, a thirty fourth stator vane has a stagger angle corresponding to the datum angle, a forty first stator vane is arranged at a circumferential angle position of 277° from the first stator vane, the forty first stator vane has a stagger angle of +0.3° relative to the datum angle, a forty fourth stator vane is arranged at a circumferential angle position of 297° from the first stator vane, the forty fourth stator vane has a stagger angle corresponding to the datum angle, a fifty first stator vane is arranged at a circumferential angle position of 346° from the first stator vane, the fifty first stator vane has a stagger angle of −1.7° relative to the datum angle.

10. An aircraft having a gas turbine engine as claimed in claim 2 wherein the stator vane stagger angles and the stator vane camber angles are arranged such that a flow field downstream of the low pressure compressor matches a flow field upstream of the low pressure compressor, wherein the stator vane arrangement comprising fifty two equi-circumferentially spaced stator vanes, the stator vanes at different circumferential positions have different stagger angles, the at least one obstruction comprising a pylon at a first circumferential position and a strut at a second diametrically opposite position, a first stator vane is arranged upstream of the pylon and has a stagger angle of −1.5° relative to a datum angle, an eighth stator vane is arranged at a circumferential angle position of 42° from the first stator vane, the eighth stator vane has a stagger angle of +3° relative to the datum angle, a twenty first stator vane is arranged at a circumferential angle position of 124° from the first stator vane, the twenty first stator vane has a stagger angle corresponding to the datum angle, a twenty eighth stator vane is arranged at a circumferential angle position of 168° from the first stator vane, the twenty eighth stator vane has a stagger angle of −4° relative to the datum angle, a thirtieth stator vane is arranged at a circumferential angle position of 180° from the first stator vane, a thirtieth stator vane has a stagger angle of −2.8° relative to the datum angle, a thirty fifth/thirty sixth stator vane is arranged at a circumferential angle position of −156°/−150° from the first stator vane, the thirty fifth/thirty sixth stator vane has a stagger angle of +1° relative to the datum angle, a forty seventh stator vane is arranged at a circumferential angle position of −75° from the first stator vane, the forty seventh stator vane has a stagger angle corresponding to the datum angle, a fifty sixth stator vane is arranged at a circumferential angle position of −18° from the first stator vane, the fifty sixth stator vane has a stagger angle of −3.2° relative to the datum angle.

11. A gas turbine engine comprising an intake, a low pressure compressor including a plurality of rotor blades arranged downstream of the intake, a plurality of stator vanes arranged downstream of the low pressure compressor and at least one obstruction arranged downstream of the stator vanes, whereby in use the at least one obstruction produces a circumferentially varying back pressure on the stator vanes and the intake supplies an airflow having a circumferentially varying forward flow pressure to the low pressure compressor due to a non-axisymmetric flow of air into the intake, the stator vanes being arranged to balance the circumferentially varying back pressure from the at least one obstruction with the circumferentially varying forward flow pressure from the intake at substantially all circumferential positions, wherein the stator vanes have different camber configurations at different circumferential positions.

12. A method of analyzing a gas turbine engine comprising an intake, a low pressure compressor including a plurality of rotor blades arranged downstream of the low pressure compressor and at least one obstruction arranged downstream of the stator vanes, in use that at least one obstruction producing a circumferentially varying back pressure on the stator vanes and the intake supplying an airflow having a circumferentially varying forward pressure to the low pressure compressor, the method comprising the steps of:
   a) analyzing the aerodynamic flow through the intake, low pressure compressor, the stator vanes and the at least one obstruction to determine the effect of the non axisymmetric flows,
   b) arranging the stator vanes to balance the circumferentially varying back pressure from the at least one obstruction with circumferentially varying forward pressure from the intake at substantially all circumferential positions.

13. A method as claimed in claim 12 wherein step b) comprises optimizing the circumferential variation in force on the low pressure compressor during rotation as a result of pressure differentials across the low pressure compressor.

14. A method as claimed in claim 13 wherein step b) comprises optimizing the circumferential variation in flow incidence angle at the stator vane leading edge.

15. A method as claimed in claim 13 wherein step b) comprises optimizing the circumferential variation in flow speed at the stator vane leading edge.

16. A method as claimed in claim 13 wherein step b) comprises optimizing the circumferential variation in flow angle rejected from the low pressure compressor towards the stator vane leading edges.

17. A method as claimed in claim 13 wherein actuator discs represent the low pressure compressor and the stator vanes.

18. A method as claimed in claim 13 wherein step b) comprises arranging the stator vanes at different circumferential positions to have different stagger angles.

19. A method as claimed in claim 13 wherein step b) comprises arranging the stator vanes at different circumferential positions to have different camber configurations.

20. A method as claimed in claim 19 wherein step b) comprises arranging the stator vanes at different radial positions to have different camber configurations.

21. A method as claimed in claim 19 wherein step b) comprises arranging the stator vanes in groups.

22. A method analyzing a gas turbine engine comprising an intake, a low pressure compressor including a plurality of rotor blades arranged downstream of the intake, a plurality of stator vanes arranged downstream of the low pressure compressor and at least one obstruction arranged downstream of the stator vanes, in use the at least one obstruction producing a circumferentially varying back pressure on the stator vanes and the intake supplying an airflow having a circumferentially varying forward pressure to the low pressure compressor, the method comprising the steps of;
   a) analyzing the aerodynamic flow through the intake, the low pressure compressor, the stator vanes and the at least one obstruction to determine the effect of the non axisymmetric flows,
   b) arranging the stator vanes to optimize the circumferential variation in force on the low pressure compressor during rotation as a result of pressure differentials across the low pressure compressor to reduce fan forcing.

* * * * *